US010102697B2

(12) United States Patent
Sample (10) Patent No.: US 10,102,697 B2
(45) Date of Patent: Oct. 16, 2018

(54) HIGH-Q AND OVER-COUPLED NEAR-FIELD RFID READER ANTENNA FOR IMPROVED TAG READ RANGE

(71) Applicant: DISNEY ENTERPRISES, INC., Burbank, CA (US)

(72) Inventor: Alanson Sample, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/929,320

(22) Filed: Oct. 31, 2015

(65) Prior Publication Data

US 2017/0124790 A1     May 4, 2017

(51) Int. Cl.
 *G05B 19/00* (2006.01)
 *G07C 9/00* (2006.01)
 *G06K 7/10* (2006.01)

(52) U.S. Cl.
 CPC ...... *G07C 9/00111* (2013.01); *G06K 7/10366* (2013.01); *G07C 9/00309* (2013.01)

(58) Field of Classification Search
 CPC ............ G07C 9/00111; G07C 9/00309; G07C 9/00904; G06K 7/10366
 USPC ........................................................ 340/5.61
 See application file for complete search history.

(56) References Cited

U.S. PATENT DOCUMENTS

| 4,531,117 A * | 7/1985 | Nourse | G08B 13/2414 340/572.4 |
| 4,609,911 A * | 9/1986 | Nourse | G08B 13/24 340/572.1 |
| 7,894,770 B2 | 2/2011 | Washiro | |
| 9,097,038 B1 * | 8/2015 | Cohen | E05B 65/087 |
| 2007/0115127 A1 * | 5/2007 | Harper | G06Q 10/00 340/572.1 |
| 2007/0175654 A1 * | 8/2007 | Keith | H04Q 1/06 174/135 |
| 2008/0150325 A1 * | 6/2008 | Seidel | E02F 9/0833 296/190.11 |
| 2008/0231421 A1 * | 9/2008 | Tuttle | G06K 19/07749 340/10.1 |
| 2010/0126071 A1 * | 5/2010 | Hill | E06B 7/32 49/70 |

(Continued)

OTHER PUBLICATIONS

Sample, et al, "Analysis, Experimental Results, and Range Adaptation of Magnetically Coupled Resonators for Wireless Power Transfer," 2010 IEEE.

(Continued)

*Primary Examiner* — Thomas McCormack
(74) *Attorney, Agent, or Firm* — Robert G. Crouch; Marsh Fischmann & Breyfogle LLP (57) ABSTRACT

An RFID system in which at least one of the RFID tag antenna and the RFID reader antenna has an impedance matching network associated therewith in order to better match the impedances of the two antennas. This impedance matching places the antennas into an over-coupled regime once they are within a reasonable distance of each other (e.g., 2 to 50 mm). It also increases the Q-factor of the improved antenna, which can greatly increase the range at which the RFID reader can read the RFID tag. This improved RFID system may be used in any of a variety of application, including operating a door lock mechanism.

11 Claims, 9 Drawing Sheets

(56) References Cited

U.S. PATENT DOCUMENTS

| | | | | |
|---|---|---|---|---|
| 2010/0328028 | A1* | 12/2010 | Dekker | G06K 19/07749 340/5.8 |
| 2010/0328045 | A1* | 12/2010 | Goto | G06K 7/0008 340/10.4 |
| 2011/0205026 | A1* | 8/2011 | Bateman | G06K 7/0008 340/10.1 |
| 2012/0272696 | A1* | 11/2012 | Hill | E06B 7/32 70/101 |
| 2013/0049932 | A1* | 2/2013 | Baym | A23L 35/00 340/10.1 |
| 2013/0049934 | A1* | 2/2013 | Baym | G06K 19/0723 340/10.1 |
| 2013/0161389 | A1* | 6/2013 | Roedig | G06K 7/10316 235/439 |
| 2013/0292471 | A1* | 11/2013 | Brasher | G06K 7/10316 235/439 |
| 2014/0002236 | A1* | 1/2014 | Pineau | G06F 21/32 340/5.6 |
| 2015/0235066 | A1* | 8/2015 | Hattori | G06K 7/10316 340/10.1 |
| 2015/0379791 | A1* | 12/2015 | Russell | G07C 9/00031 340/5.61 |
| 2016/0086458 | A1* | 3/2016 | Biggs | G08B 6/00 381/151 |

OTHER PUBLICATIONS

Brown, W., "The History of Power Transmission by Radio Waves," Microwave Theory and Techniques, IEEE Transactions on, vol. 32, No. 9, pp. 1230-1242, Sep. 1984.

Sample, A., et al, "Experimental Results with Two Wireless Power Transfer Systems," in Radio and Wireless Symposium, 2009, RWS '09, IEEE, Jan. 2009, pp. 16-18.

PowerMat Inc., http://www.powermat.com, Nov. 2009.

Karalis, A., et al, "Efficient Wireless Non-Radiative Mid-Range Energy Transfer," Annals of Physics, vol. 323, No. 1, pp. 34-48, Jan. 2008 Special Issue 2008, http://sciencedirect.com/science/article/B6WB1-4NKJ0J9-1/2/a898006221e6436e8d84aaf3837d00a6.

Kurs, A., et al, "Wireless Power Transfer Via Strongly Coupled Magnetic Resonances," Science, vol. 317, No. 5834, pp. 83-86, 2007, http://www.sciencemag.org/cgi/content/abstract/317/5834/83.

Cannon, B., et al, "Magnetic Resonant Coupling as a Potential Means for Wireless Power Transfer to Multiple Small Receivers," Power Electronics, IEEE Transactions, vol. 24, No. 7, pp. 1819-1825, Jul. 2009.

Low, Z.N., et al, "Design and Test of a High Power High-Efficiency Loosely Coupled Planar Wireless Power Transfer System," Industrial Electronics, IEEE Transactions, vol. 56, No. 5, pp. 1801-1812, May 2009.

Casanova, J., et al, "A Loosely Coupled Planar Wireless Power System for Multiple Receivers," Industrial Electronics, IEEE Transactions, vol. 56, No. 8, pp. 3060-3068, Aug. 2009.

Kim, Y.H., et al, "Optimization of Wireless Power Transmission Through Resonant Coupling," Compatibility and Power Electronics, 2009, CPE'09, May 2009, pp. 426-431.

Woodruff, A., et al, "Portable, but not Mobile: A Study of Wireless Laptops in the Home," Proc. Pervasive, pp. 216-233, May 2007.

Fletcher, N., et al, "The Physics of Musical Instruments," Springer-Verlag, 1998.

Mongia, R., et al, "RF and Microwave Coupled-Line Circuits," City: Artech House Publishers, 2007.

Kajfez, D., et al, "Q-Factor Measurement with Network Analyzer," Microwave Theory and Techniques, IEEE Transactions, vol. 32, No. 7, pp. 666-670, Jul. 1984.

Chan, H., et al, "A Simplified Neumann's Formula for Calculation of Inductance of Spiral Coil," Power Electronics and Variable Speed Drives, 2000, 8th International Conference, IEEE Conf. Publ. No. 475, pp. 69-73.

Non-Final Office Action, U.S. Appl. No. 15/586,220, dated Jan. 19, 2018.

* cited by examiner

HIGH-Q AND OVER-COUPLED NEAR-FIELD RFID READER ANTENNA FOR IMPROVED TAG READ RANGE

BACKGROUND

The use of RFID (Radio Frequency Identification) technology is very common in the modern day world. One specific such use is in door lock mechanisms (such as for individual hotel rooms), in which case the door lock may include an RFID reader to detect the proximity of a device worn or held by a hotel guest and unlock the door. Problems with unlocking doors can occur due to challenging ergonomics related to door jams and door handles, due to the short read range of the RFID reader, and/or due to less than optimal performance by the RFID reader. It is desirable to increase the success rate of unlocking doors when hotel guests have their device within a reasonable proximity of the door lock mechanism.

Many forms of RFID make use of electromagnetic induction between a pair of coils (loop antennas), one typically located in an RFID reader and one typically located in an RFID tag. One class of RFID technology is known as Near Field Communication (NFC) in which a pair of devices establish radio communication when they are brought to within a certain minimum distance of each other (e.g., 10 cm or less). NFC devices may typically operate at an RF frequency of 13.56 MHz. Other RFID frequencies may be in the range of 125 kHz, 433 MHz, 866.5 MHz, 915 MHz, and in the microwave frequencies, to name a few.

One parameter of an antenna and associated circuit is known as a quality-factor (or Q-factor). It is a dimensionless quantity that describes how under-damped an oscillator or resonator is, in addition to characterizing a resonator's bandwidth relative to its center frequency. Higher Q indicates a lower rate of energy loss relative to the stored energy of the resonator; the oscillations die out more slowly. A pendulum suspended from a high-quality bearing, oscillating in air, has a high Q, while a pendulum immersed in oil has a low one. Resonators with high quality factors have low damping so that they ring longer. With antennas and their associated circuits, a high Q-factor means the antenna and circuit will resonate longer than if they had a lower Q-factor.

It is against this background that the techniques described herein have been developed.

SUMMARY

Disclosed herein is an RFID system which includes a tag including an antenna that selectively transfers a data signal; and a reader including an antenna that receives the data signal from the tag. At least one of the tag antenna and the reader antenna have a Q-factor that is greater than 30. The tag antenna and the reader antenna are sufficiently matched in impedance to place the two antennas into an over-coupled regime.

The tag may be worn by a user. The tag may be attached to a wristband worn by a user. The reader may be attached to a door having a door lock mechanism and provide an unlock signal to the door lock mechanism. The tag may be attached to a wristband worn by a user and the reader attached to a door having a door lock mechanism and provide an unlock signal to the door lock mechanism. The door may include a generally planar door surface and a door latch actuator that pivots about a pivot axis, the door latch actuator including an elongated handle portion defining a handle axis that extends generally transversely from the pivot axis and generally parallel to the planar door surface, the reader being located in relation to the planar door surface in a position vertically offset from and spaced apart from the handle axis and horizontally offset from and spaced apart from the pivot axis.

The two antennas may be in an over-coupled regime when they are located within 30 mm of each other. The two antennas may be in an over-coupled regime when they are located within 20 mm of each other. The two antennas may be in an over-coupled regime when they are located within 10 mm of each other. The reader antenna may include an impedance matching network associated therewith. The tag antenna may include an impedance matching network associated therewith. The tag antenna may include an impedance matching network associated therewith. The data signal may include a tag identifier. The tag identifier may include an identification number.

Also disclosed is an RFID system which includes a tag including an antenna that selectively transfers a data signal; and a reader including an antenna that receives the data signal from the tag. At least one of the tag antenna and the reader antenna have a Q-factor that is greater than 30. At least one of the tag antenna and the reader antenna include an impedance matching network associated therewith.

Also disclosed is an RFID system which includes a tag including an antenna that selectively transfers a data signal; and a reader including an antenna that receives the data signal from the tag. The tag antenna and the reader antenna are over-coupled when the antennas are within 10 mm of each other.

Also disclosed is an RFID system which includes a tag including an antenna that selectively transfers a data signal, wherein the data signal includes a tag identifier; and a reader including an antenna that receives the data signal from the tag. At least one of the tag antenna and the reader antenna have a Q-factor that is greater than 30. At least one of the tag antenna and the reader antenna include an impedance matching network associated therewith. The tag antenna and the reader antenna are over-coupled when the antennas are within 10 mm of each other.

The tag may be attached to a wristband worn by a user and the reader is attached to a door having a door lock mechanism and provides an unlock signal to the door lock mechanism. The door may include a generally planar door surface and a door latch actuator that pivots about a pivot axis, the door latch actuator including an elongated handle portion defining a handle axis that extends generally transversely from the pivot axis and generally parallel to the planar door surface, the reader being located in relation to the planar door surface in a position vertically offset from and spaced apart from the handle axis and horizontally offset from and spaced apart from the pivot axis.

Also disclosed is an RFID system which includes a reader including an antenna that selectively transfers an electrical signal; and a tag including an antenna that receives the electrical signal from the tag. At least one of the tag antenna and the reader antenna have a Q-factor that is greater than 30. The tag antenna and the reader antenna are sufficiently matched in impedance to place the two antennas into an over-coupled regime.

Also disclosed is an RFID system which includes a tag including an antenna that selectively transfers a data signal, wherein the tag is carried by a wristband adapted to be worn by a user; and a reader including an antenna that receives the data signal from the tag, wherein the reader is carried by a door. The door includes a generally planar door surface and a door latch actuator that pivots about a pivot axis, the door latch actuator including an elongated handle portion defining a handle axis that extends generally transversely from the pivot axis and generally parallel to the planar door surface, the reader being located in relation to the planar door surface in a position vertically offset from and spaced apart from the handle axis and horizontally offset from and spaced apart from the pivot axis.

DETAILED DESCRIPTION

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

As part of addressing the problems described in the background above, it has been recognized that current RFID NFC system designs are all of an "under-coupled nature." Under-coupling (also known as "loosely coupled") and over-coupling refer to the degree of inductive coupling between two different resonant circuits. In the present case, one of the resonant circuits is the coil or antenna in an RFID tag. The other resonant circuit is the coil or antenna in the RFID reader. The mutual inductance (M) of a pair of resonant circuits is equal to the coupling coefficient (k) times the square-root of the product of the inductance of the first coil and the inductance of the second coil ($M=k(L_1 L_2)^{0.5}$), where k falls within a range from 0 to 1.

In a highly under-coupled scenario, the bandwidth will be narrow. As the mutual inductance increases (becoming less under-coupled), the bandwidth continues to grow. Eventually, the coupling coefficient reaches a critical point, at which the power spikes and the bandwidth drops sharply. Beyond this null at the critical point, the bandwidth increases further, but the center frequency of the response is no longer the peak and there become a pair of peaks, one on either side of the center frequency. This region (beyond the critical point) is referred to as the over-coupling region or regime. Basically, when over-coupled, the receiving antenna receives more magnetic flux than is needed to support the load associated with the receiving antenna.

In order to avoid issues in reading RFID tags at the null (critical point), RFID NFC systems to date have been purposely designed to remain in the under-coupled region. This is done, in part, by decreasing the quality factor (Q-factor) of the transmit antenna (the tag) in order to increase the bandwidth. This can include keeping the Q-factor in the range of 10 to 20. Unfortunately, in an under-coupled scenario with a Q-factor in this range, the read range of the RFID reader drops off sharply. In such scenarios, the performance of devices such as door lock mechanisms can be unreliable and ultimately frustrating to hotel guests.

Another issue has to do with the need for the RFID reader to provide sufficient power to the passive RFID tag so that the tag can send a signal back to the RFID reader. In under-coupled systems, it can be important for the size of the antenna in the tag to match the size of the antenna in the reader. Unfortunately, various applications may require a reader to be able to power and read tags of different sizes. In order to address this issue, non-optimal solutions have included nesting a smaller antenna inside of a larger antenna.

Further, high-Q resonators that are inductively coupled can efficiently transfer energy to one another if the inductive link between them is low in loss. Accordingly, to increase the operating range of a near-field tag, it can be desirable to use very high Q resonators.

Partially in reaction to all of the above, a system has been developed where the RFID reader and the RFID tag are intentionally designed to be over-coupled. It is believed that RFID systems with over-coupled designs are novel. This can be accomplished by improving the impedance matching between the tag antenna and the reader antenna. Further, in the over-coupled setting, there is no need to intentionally limit the Q-factor of the antenna, so read range can be increased. Further, with an over-coupled design, the effective bandwidth is increased by the dual-peak response. In addition, although the dual-peak response does somewhat decrease the power transfer efficiency, this effect is not very significant since the tag is sufficiently close to the reader to provide sufficient power, despite being less efficient.

Further, the RFID system related to operating a door lock mechanism has been improved by locating the reader in a physical position on the door that is offset from the normal door lock/key mechanism location. Since the RFID tag may be worn on the wrist of the user, the RFID reader has been moved to a physical position on the door that is in the region close to where the wrist of the user will be when the user attempts to use the door handle.

Figure 1:
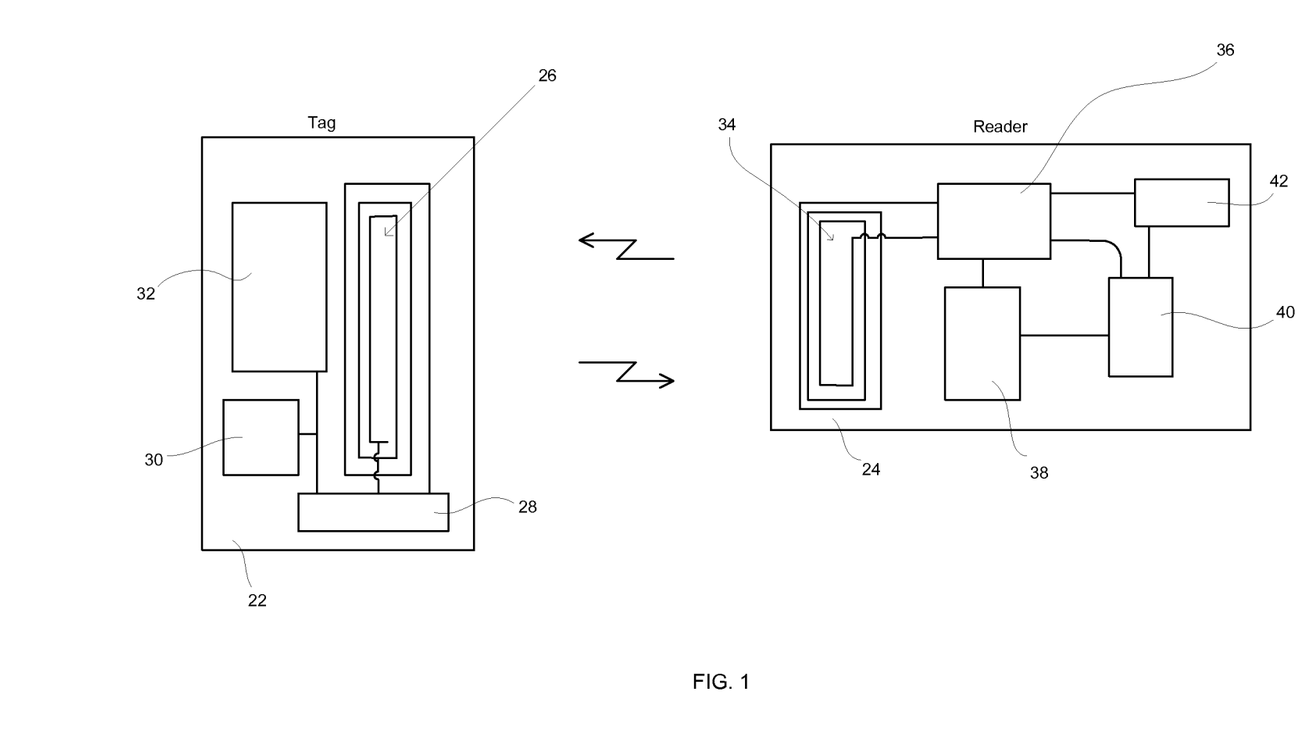
FIG. 1 is a block diagram of an RFID system.

FIG. 1 shows a simplified RFID system 20 that includes an RFID tag 22 and an RFID reader 24. The tag 22 includes an antenna 26 or coil (which coil may include an appropriate number of turns). The two opposite ends of the antenna 26 are connected to an impedance matching network 28 (which will be described in greater detail below). The impedance matching network 28 is also connected to an RFID integrated circuit (IC) 30 which provides the functionality described below. The network 28 and IC 30 may also be connected to an energy device 32. The energy device 32 may include a battery and/or another type of energy storage device (e.g., a capacitor) which can store energy received from the antenna 26 and network 28.

As mentioned, the tag 22 may be a passive device (no onboard power source), a battery-assisted passive device (e.g., the tag includes a battery but only activates in the presence of an RFID reader), or an active device. Shown herein are tags that are passive devices. Further, in the case of passive tags, the RFID reader 24 may send out an interrogation signal from which the RFID tag 22 obtains power and responds with a response signal to be read by the reader 24. This response signal typically has data embedded therein, such as a serial number or tag number. The reader 24 can then determine if this particular tag number is authorized to unlock this particular door.

Figure 2:
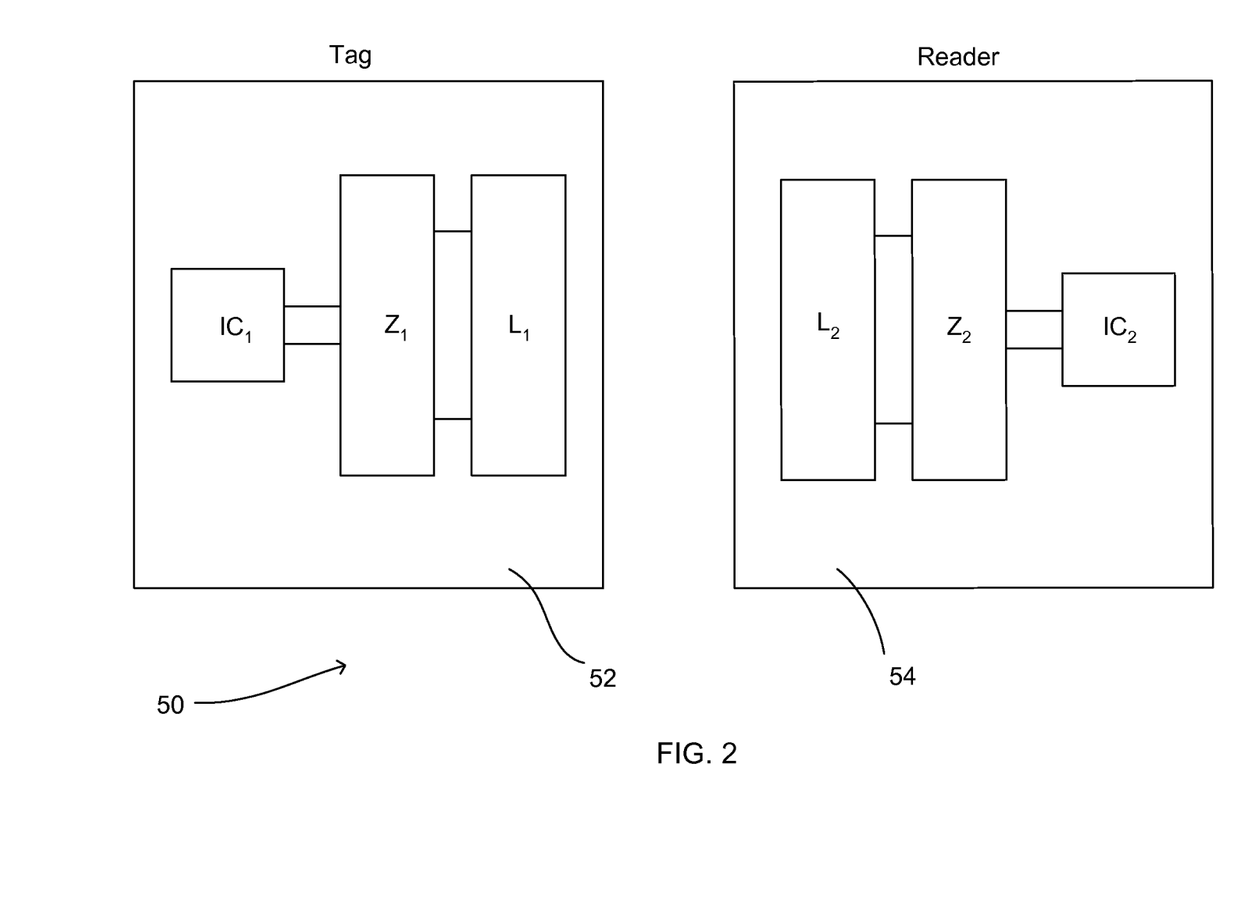
FIG. 2 is a block diagram of a first embodiment of selected components of an RFID system.

FIG. 2 shows an arrangement 50 in which only simplified versions of an RFID tag 52 and RFID reader 54 are shown. This arrangement 50 shows that the tag 52 includes a coil $L_1$, an impedance matching network $Z_1$, and an integrated circuit $IC_1$. Also, the reader 54 includes a coil $L_2$, an impedance matching network $Z_2$, and an integrated circuit $IC_2$.

Figure 3:
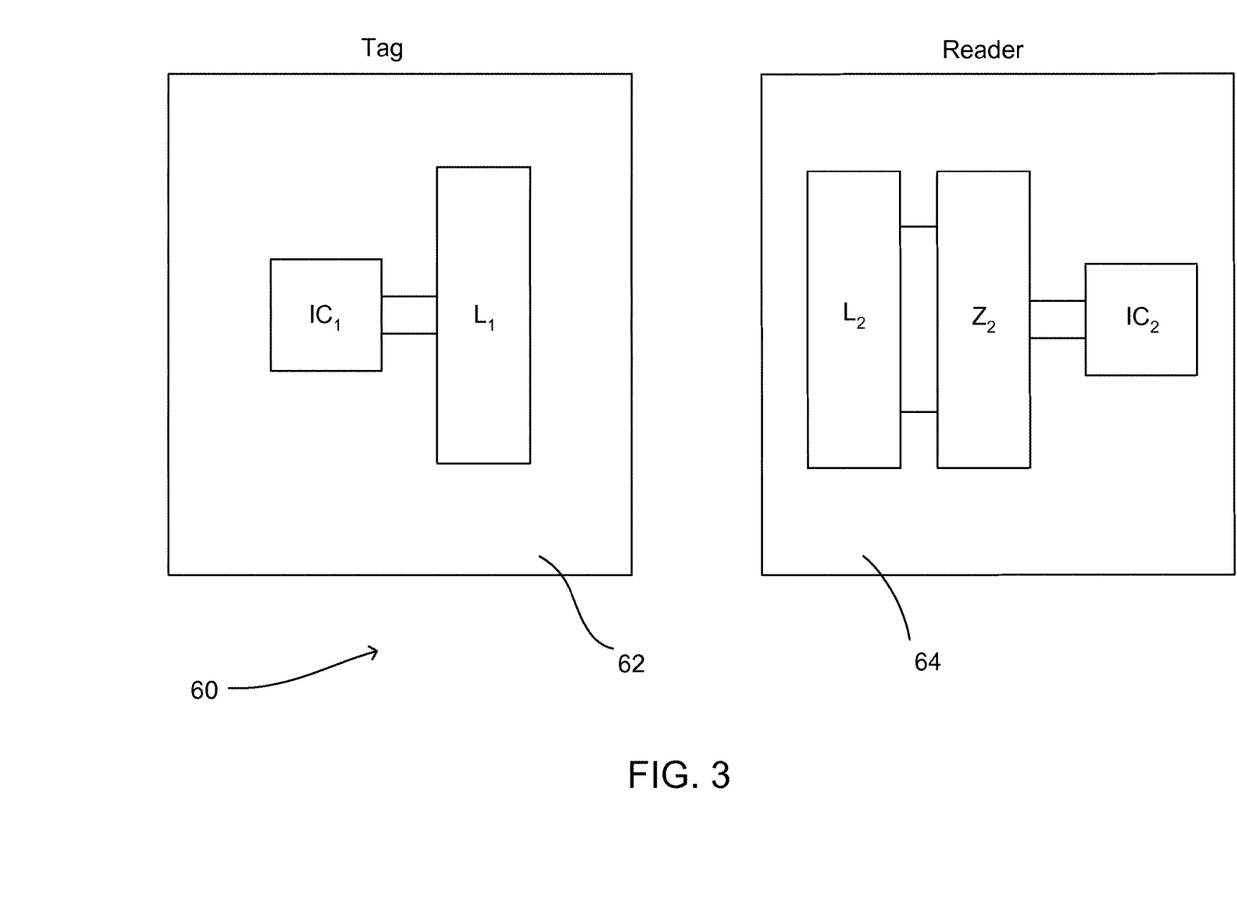
FIG. 3 is a block diagram of a second embodiment of selected components of an RFID system.

FIG. 3 shows an arrangement 60 in which only simplified versions of an RFID tag 62 and RFID reader 64 are shown. This arrangement 60 shows that the tag 62 includes a coil $L_1$ and an integrated circuit $IC_1$. Also, the reader 64 includes a coil $L_2$, an impedance matching network $Z_2$, and an integrated circuit $IC_2$.

Figure 4:
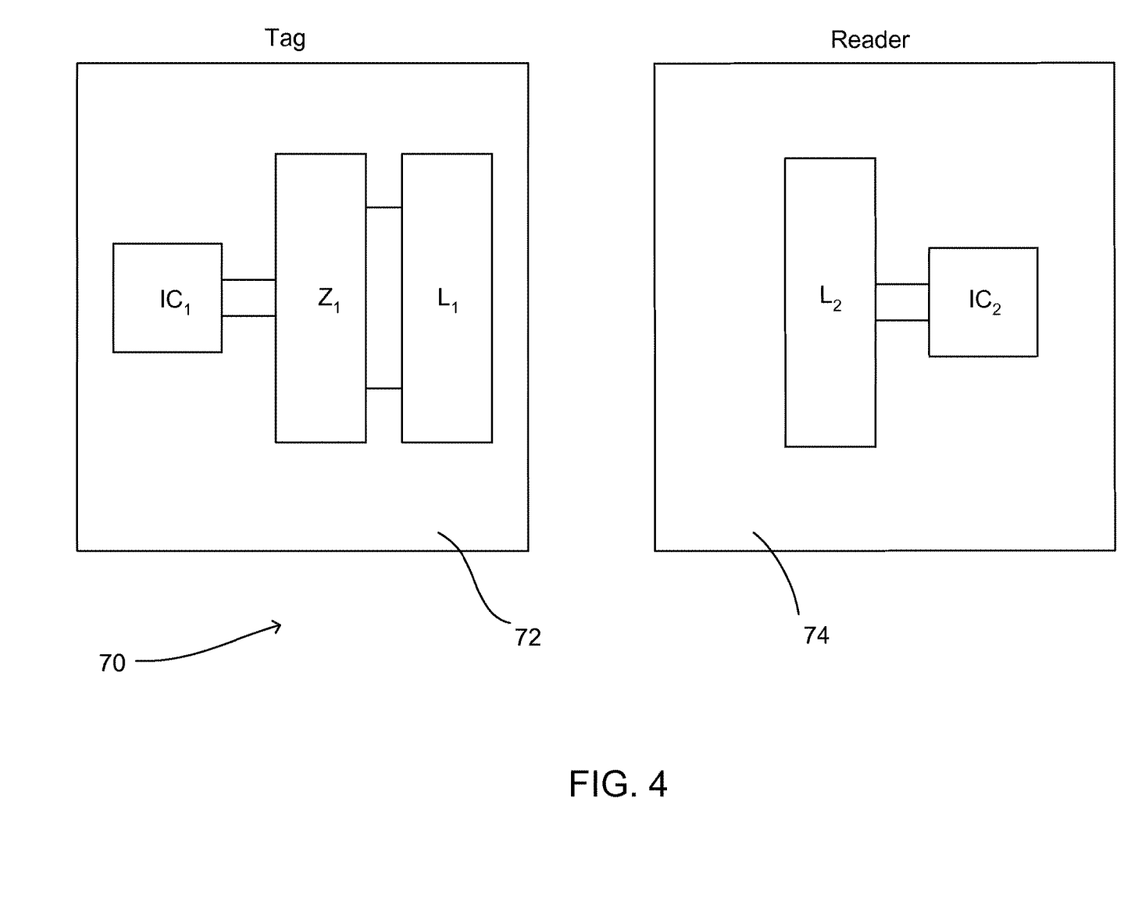
FIG. 4 is a block diagram of a third embodiment of selected components of an RFID system.

FIG. 4 shows an arrangement 70 in which only simplified versions of an RFID tag 72 and RFID reader 74 are shown. This arrangement 70 shows that the tag 72 includes a coil $L_1$, an impedance matching network $Z_1$, and an integrated circuit $IC_1$. Also, the reader 74 includes a coil $L_2$, and an integrated circuit $IC_2$.

As can be seen, these three embodiments (shown in FIGS. 2-4) demonstrate that an improved RFID system could include an impedance matching network in both the tag and the reader, in only the reader, or in only the tag. Relatedly, any combination of the tag and the reader could have a high-Q.

Figure 5:
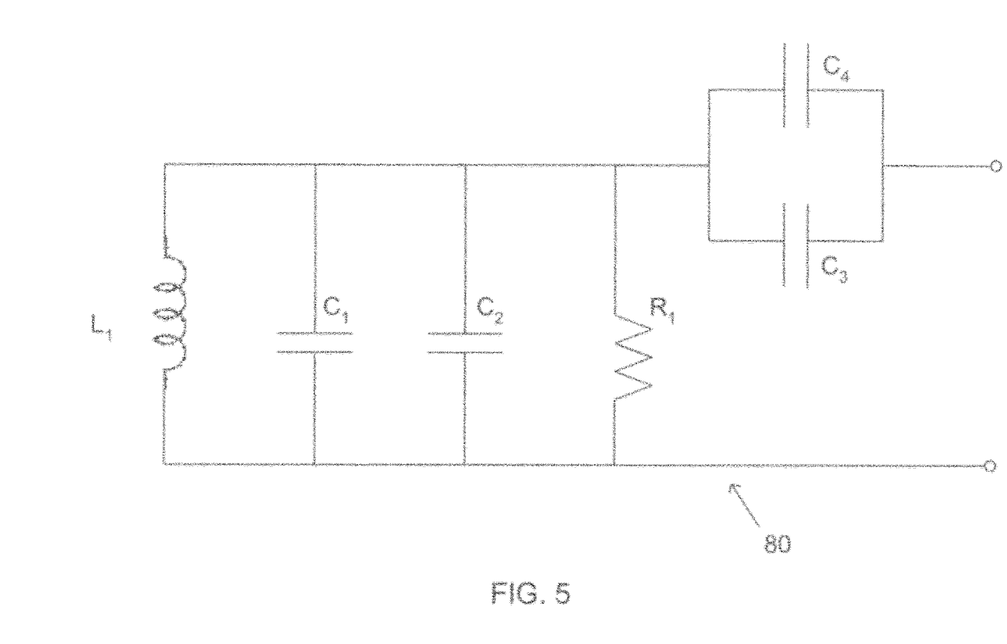
FIG. 5 is a schematic view of an antenna and impedance matching network of an RFID reader of the RFID system of FIG. 1.
Figure 6:
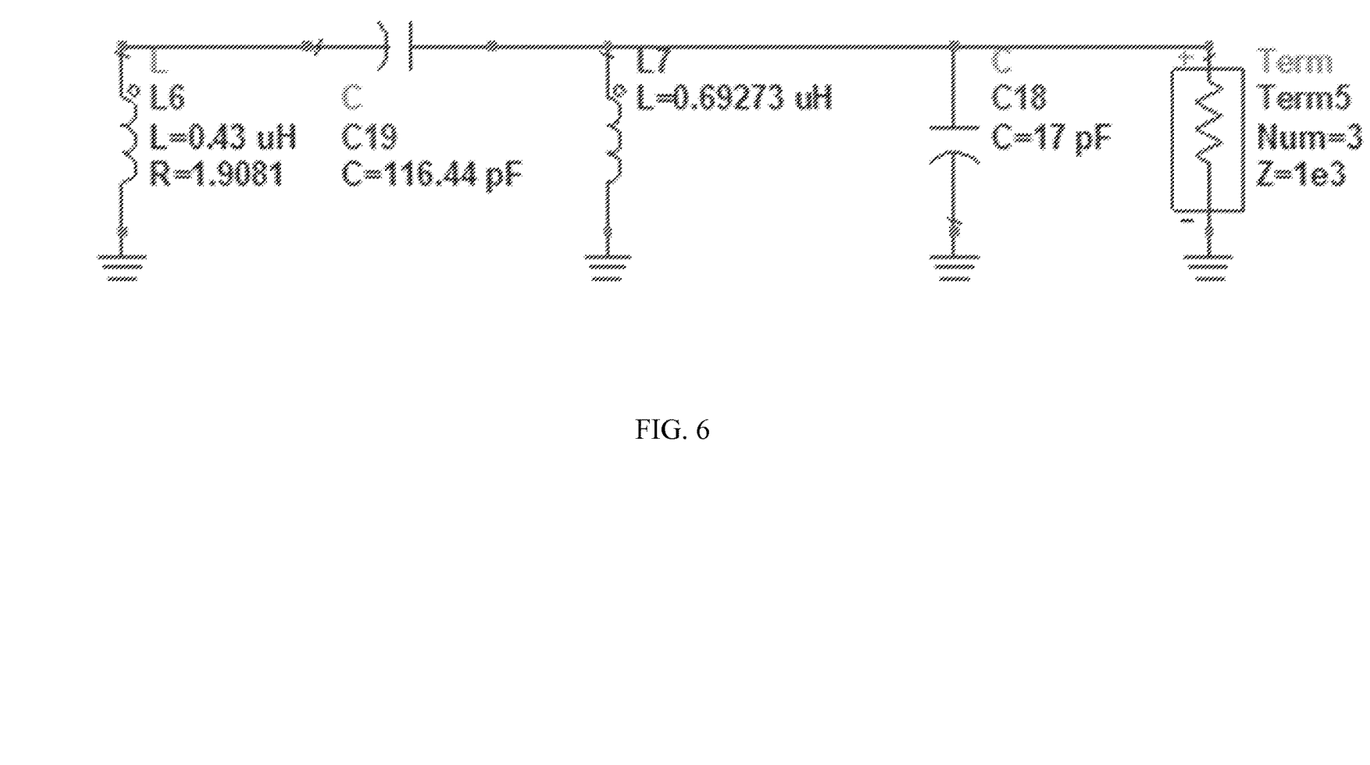
FIG. 6 is schematic view of an antenna and impedance matching network of an RFID tag of the RFID system of FIG. 1.

FIG. 5 shows a representative schematic of a reader coil and an impedance matching network 80. One example of component values that provides improved impedance matching may be:

$L_1 = \sim 1.66$ uH($1.1508\Omega + 141.83j\Omega$ @ 13.56 MHz)
$C_1 = 3-10$ pF Var-Cap
$C_2 = 83$ pF
$R_1 =$ infinite (in other words, Do Not Populate (DNP))
$C_3 = 10$ pF
$C_4 = 10$ pF FIG. 6 shows a representative schematic of a tag coil and an impedance matching network 90. One example of component values that provides improved impedance matching may be:

$L_6 = 0.43$ μH
$C_{19} = 116$ pF
$L_7 = 0.69273$ μH
$C_{tag}$ (C18) = 17 pF
$R_{tag}$ (Terms) = 1 k-ohm It should be understood that any other appropriate values for the components in the impedance matching networks could be used. It may be desirable that the overall impedances are better matched than if no such networks were employed. Further, any other type or style of impedance matching network could be used.

Although not discussed in great detail herein, the RFID tag will typically include circuitry (e.g., in an IC) that performs such functions as storing/processing information (e.g., a tag number or serial number), modulating/demodulating outgoing/ingoing signals, and collecting electrical power. Such RFID tag ICs are commonly available off-the-shelf. Similarly, the RFID reader will typically include circuitry (e.g., in an IC) that performs such functions as preparing interrogation signals, modulating/demodulating outgoing/ingoing signals, processing received signals from nearby tags, sending an output signal that may serve as an unlock signal to an associated door lock mechanism, and power-management functions with regard to an associated power source. Such RFID tag and reader ICs are commonly available off-the-shelf from manufacturers such as Texas Instruments, NXP/Philips, ST Microelectronics, and others.

Figure 7:
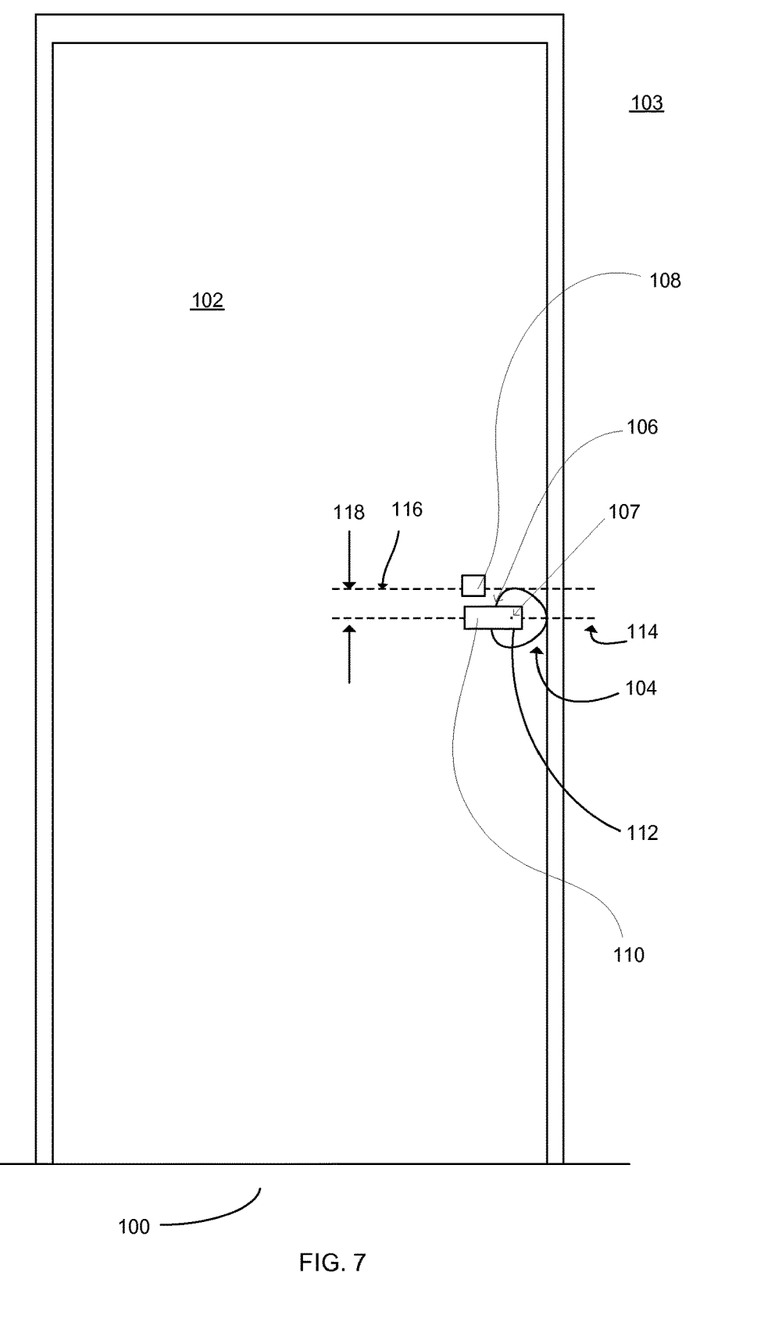
FIG. 7 is a simplified illustration of a door with a door lock and latch mechanism, from a generally horizontally-oriented view.
Figure 8:
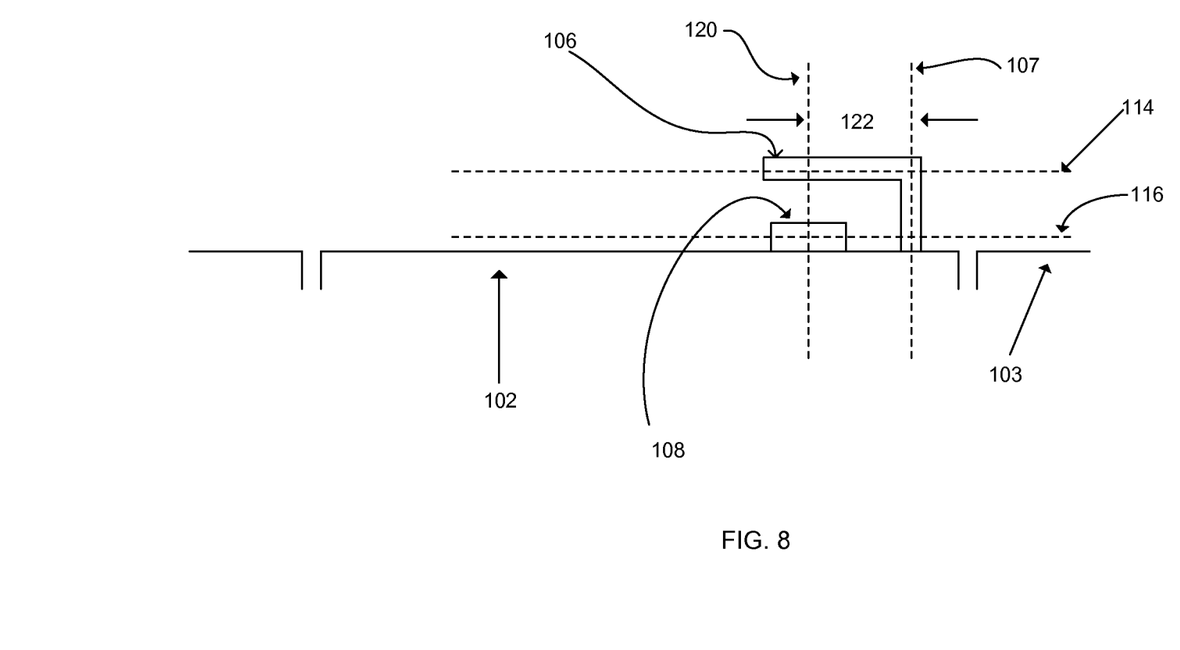
FIG. 8 is a simplified illustration of the door with the door lock and latch mechanism of FIG. 7, from a generally vertically-oriented view.

FIGS. 7 and 8 show an implementation 100 of the teachings herein. A door 102 (e.g., such as to a hotel room) has a door latch mechanism 104 that includes a door actuator or handle 106 that extends transversely from a pivot axis 107 (that extends in and out of the drawing of FIG. 7). In a conventional manner, movement of the door handle 106 in an up or down manner (as shown in FIG. 7), so as to pivot the handle 106 about the pivot axis 107, can actuate or open the door latch so that the door 102 can be opened. All or at least a portion of a door lock actuator mechanism 108 can be positioned on the door 102 vertically above (or below) a first end 110 of the door handle 106 that is offset from the pivot axis 107. A second end 112 of the door handle 106 is aligned with the pivot axis 107. The door handle can be seen to have a longitudinal axis 114 that is transverse to or generally orthogonal to the pivot axis 107. A parallel axis 116 through the door lock mechanism 108 can be seen to be offset by an amount 118 from the handle axis 114. The portion of the door lock actuator mechanism 108 that is vertically-aligned with the first end 112 of the door handle 106 includes the antenna or coil of the RFID reader. The portion of the door lock actuator mechanism 108 has a central axis 120 passing therethrough and it is horizontally-offset from the pivot axis 107 by an amount 122. In this manner, it can be appreciated that a user wearing a wristband containing the RFID tag on their left hand (for example) would be likely to grasp the door handle 106 in a manner so that their wrist is generally aligned with the door lock actuator mechanism 108. Thus, the RFID tag and reader will be fairly close to each other so that the RFID reader can read the RFID tag and actuate the door lock mechanism so as to unlock the door. For example, the RFID tag and reader might be located within 10 to 40 mm of each other in such case.

Figure 9:
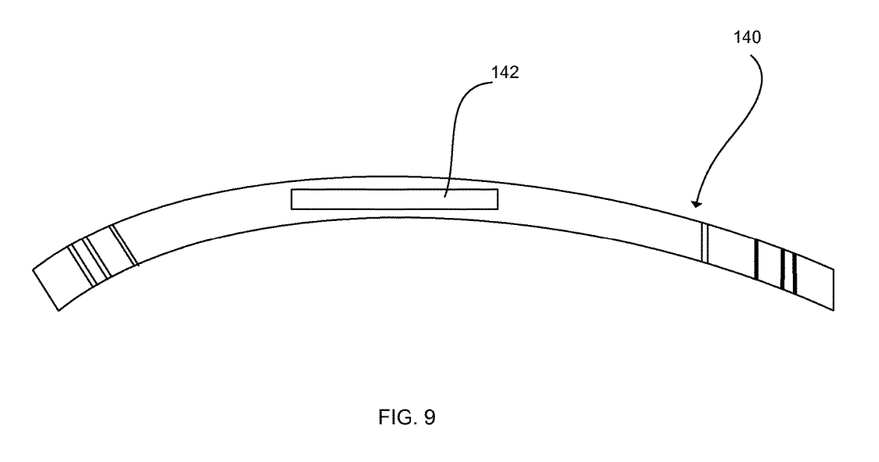
FIG. 9 is a simplified illustration of a wristband worn by a user, the wristband containing an RFID tag.

FIG. 9 shows a simplified illustration of a wristband 140 worn by a user. The wristband 140 may contain an RFID tag 142 (similar to RFID tag 22).

In the case of the door lock application where the RFID reader is associated with the door and door lock mechanism and the RFID tag is worn or carried by a user (e.g., a hotel guest), the improved techniques taught herein greatly improve the user's ability to easily unlock their hotel room door. It has been found (via both simulation results and actual measurements) that by designing a system that operates in the over-coupled regime, the use of high-Q coils is enabled (Q-factors of greater than 20, of at least 30, and of up to and greater than 100), which increases the read range without sacrificing communication bandwidth. Further, the techniques taught herein can improve the read range from less than 2 mm to in the range of 30 mm or greater. For example, the system may be in the over-coupled regime when the loops are within 10 mm of each other, resulting in successful door lock operation. This may also true at up to 20 mm of spacing between the antennas, at up to 30 mm of spacing between the antennas, and at up to and in excess of 40 mm of spacing between the antennas.

For a given size, geometry, and orientation of the tag and reader coils, the critical coupling point can be expressed as a distance. It has been found experimentally that the location (or range) in space where the (previously-described) null occurs is so narrow (e.g., 1 mm in width) that tag/reader/door lock operation is not disrupted.

In addition, the large amount of power captured by the RFID tag from the RFID reader when in the over-coupled region has been found to be sufficient to power the RFID tag, and such approaches as nested antennas are not necessary.

It is believed that no readers or tags have impedance matching networks as described herein. Many have no impedance matching networks, while it is possible (but not known) that some readers may have very simple impedance networks (perhaps including only $R_1$ and $C_1$). In such case, such case, it may be the sophistication of the impedance matching networks shown herein that helps to provide the novel and improved results. Further, it may be the operation in the over-coupled regime that helps to provide the novel and improved results.

It is also worth noting that all of the top NFC RFID reader IC manufacturers (e.g., Texas Instruments, NXP/Philips, ST Microelectronics, and so forth) provide reference designs and application notes that state that the reader antenna Q-factor must be between 10 and 20 in order to meet the bandwidth specifications for the ISO-15693 and ISO-14443 protocols. Further, they state that the input impedance of the antenna should be 50 ohms when the antenna is in isolation. These two conditions limit the antenna design to low-Q coils which are under-coupled. Further, since traditional RFID antennas are limited to the under-coupled regime, the only way they can generate enough flux density to power the RFID tags with small antennas is to create secondary (or nested) antennas, which sacrifice overall system performance. Thus, the leading technology companies in this field have clearly and specifically taught away from using antennas with Q-factors greater than 20 and from using over-coupled designs. Further, testing has shown that with the high Q-factors and over-coupled designs taught herein, the bandwidth requirements of the above-referenced specifications are met, despite statements and implications to the contrary by the industry leaders. All of this helps to establish the non-obvious nature of the teachings herein.

Of course, while the discussion herein has related to the use of improved RFID technology for unlocking door locks, it should be understood that the improved RFID technology can be similarly applied to any other RFID application. Without limitation, these could include RFID applications where RFID readers or tags are embedded in wrist-worn devices (e.g., smart watches), hand-held devices (e.g., smart phones), laptops, other mobile communication devices, or any other suitable device.

It should be understood that the teachings herein of high-Q readers and tags, over-coupled reader/tag combinations, impedance matching, and so forth, all apply to transmission of data signals only, transmission of power signals only, and transmission of any electrical signals (including data signals and power signals).

Loaded quality factor refers to the quality factor of the coil when the RFID Integrated Circuit is attached. Unloaded quality factor refers to the quality factor of the coil when the RFID Integrated Circuit is not attached. Herein, we may typically be referring to the unloaded quality factor. For instance, the RFID reader with an output impedance of 50 ohms may be attached to the RFID coil plus the impedance matching network.

NFC tags contain data and are typically read-only, but may be rewriteable. They can be custom-encoded by their manufacturers or use the specifications provided by the NFC Forum, an industry association charged with promoting the technology and setting key standards. The tags can securely store personal data such as debit and credit card information, loyalty program data, PINs and networking contacts, among other information. RFID readers transmit data to the tag via amplitude modulation. Tags transmits data back to the reader via load modulation. For example, the reader transmits a continuous constant amplitude single and the tag changes its load (between high and low). The change in load can be sensed by the reader to encode data.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

I claim:

1. An RFID system for actuating door locks, comprising:
a tag including an antenna coupled to a first integrated circuit that in combination selectively transfers a data signal; and
a reader including an antenna coupled to a second integrated circuit by an impedance matching network that in combination receives the data signal from the tag;
wherein at least one of the tag antenna and the reader antenna have a Q-factor that is greater than 30;
wherein the reader antenna and the second integrated circuit are sufficiently matched in impedance by the impedance matching network to place the reader antenna and the second integrated circuit into an over-coupled regime with regard to each other.

2. An RFID system as defined in claim 1, wherein the tag is worn by a user.

3. An RFID system as defined in claim 1, wherein the tag is attached to a wristband worn by a user.

4. An RFID system as defined in claim 1, wherein the reader is attached to a door having a door lock mechanism and provides an unlock signal to the door lock mechanism.

5. An RFID system as defined in claim 1, wherein the tag is attached to a wristband worn by a user and the reader is attached to a door having a door lock mechanism and provides an unlock signal to the door lock mechanism.

6. An RFID system as defined in claim 5, wherein the door pivots about a door pivot axis and the door includes a planar door surface and a door latch actuator that pivots about an actuator pivot axis, the door latch actuator including an elongated handle portion defining a handle axis that extends transversely from the actuator pivot axis and parallel to the planar door surface, the reader being located in relation to the planar door surface in a position vertically offset from and spaced apart from the handle axis and horizontally offset from and spaced apart from the actuator pivot axis in a direction toward the door pivot axis.

7. An RFID system as defined in claim 1, wherein the reader antenna includes an impedance matching network associated therewith.

8. An RFID system as defined in claim 7, wherein the tag antenna includes an impedance matching network associated therewith.

9. An RFID system as defined in claim 1, wherein the tag antenna includes an impedance matching network associated therewith.

10. An RFID system as defined in claim 1, wherein the data signal includes a tag identifier.

11. An RFID system as defined in claim 10, wherein the tag identifier includes an identification number.

* * * * *